United States Patent
Doken (10) Patent No.: US 12,223,573 B2
(45) Date of Patent: *Feb. 11, 2025

(54) SYSTEMS AND METHODS FOR OBSCURING RESTRICTED TEXT AND/OR IMAGES IN A VIDEO CONFERENCING SESSION

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,950

(22) Filed: Sep. 15, 2023

(65) Prior Publication Data

US 2024/0005577 A1 Jan. 4, 2024

Related U.S. Application Data

(63) Continuation of application No. 17/549,309, filed on Dec. 13, 2021, now Pat. No. 11,869,126.

(51) Int. Cl.
| | |
|---|---|
| *G06T 11/60* | (2006.01) |
| *G06T 9/00* | (2006.01) |
| *G06T 11/20* | (2006.01) |
| *G06V 10/74* | (2022.01) |
| *G06V 20/20* | (2022.01) |
| *G06V 30/14* | (2022.01) |
| *G06V 30/146* | (2022.01) |
| *H04L 65/403* | (2022.01) |

(52) U.S. Cl.
CPC ............... *G06T 11/60* (2013.01); *G06T 9/00* (2013.01); *G06T 11/203* (2013.01); *G06V 10/761* (2022.01); *G06V 20/20* (2022.01); *G06V 30/1456* (2022.01); *G06V 30/147* (2022.01); *H04L 65/403* (2013.01); *G06T 2200/24* (2013.01); *G06V 2201/02* (2022.01)

(58) Field of Classification Search
None
See application file for complete search history.

(56) References Cited

U.S. PATENT DOCUMENTS

| | | | |
|---|---|---|---|
| 7,761,892 B2 | 7/2010 | Ellis et al. | |
| 2007/0185993 A1 | 8/2007 | McArdle | |
| 2010/0053302 A1 | 3/2010 | Ivashin et al. | |
| 2010/0257590 A1* | 10/2010 | Inoue | H04N 21/4622 |
| | | | 725/25 |
| 2014/0298197 A1 | 10/2014 | Kwon | |
| 2015/0278534 A1 | 10/2015 | Thiyagarajan et al. | |
| 2015/0302207 A1 | 10/2015 | Sprenger et al. | |
| 2018/0053003 A1 | 2/2018 | Nair | |

(Continued)

*Primary Examiner* — Jeffrey J Chow
(74) *Attorney, Agent, or Firm* — Haley Guiliano LLP (57) ABSTRACT

Systems and methods for obscuring images and/or text during a screen sharing operation in a video conferencing session are described herein. In some embodiments, a client device detects a screen sharing operation. As part of the screen sharing operation, the client device captures an image of a display. The client device recognizes images and/or text in the image of the display and determines whether any of the images and/or text are restricted. If the images and/or text are determined to be restricted, the client device obscures the images and/or text prior to encoding of the image of the display for transmission.

18 Claims, 8 Drawing Sheets

(56) References Cited

U.S. PATENT DOCUMENTS

| | | |
|---|---|---|
| 2019/0042871 A1 | 2/2019 | Pogorelik |
| 2022/0309183 A1 | 9/2022 | Jose et al. |
| 2023/0142898 A1* | 5/2023 | Chien .................. G06F 21/629 |
| | | 713/186 |
| 2023/0186534 A1 | 6/2023 | Doken |

* cited by examiner

SYSTEMS AND METHODS FOR OBSCURING RESTRICTED TEXT AND/OR IMAGES IN A VIDEO CONFERENCING SESSION

CROSS-REFERENCE TO RELATED APPLICATION

This application is a continuation of U.S. patent application Ser. No. 17/549,309, filed Dec. 13, 2021, the disclosure of which is incorporated by reference in its entirety.

BACKGROUND

This disclosure is generally directed to video conferencing sessions among a plurality of devices. In particular, methods and systems are provided for obscuring images and/or text identified as being restricted during a screen sharing session.

SUMMARY

Video conferencing has become increasingly prevalent across businesses as it allows people in different geo-locations to take part in a meeting conference call without requiring them to be in the same physical location. As more people have begun working from home, the use of video conferencing technology has skyrocketed as more and more people have begun using video conferencing in their everyday lives to meet with clients, supervisors, or other employees.

Generally, most video conferencing sessions are performed in a same or similar way. At a user device, a camera captures video content. The video content is encoded, such as through the High Efficiency Video Coding (HEVC) or H.265 standard. The encoded video is then transmitted across a network to the other devices in the video conferencing call, such as through a conferencing controller. A similar method of transmission is used when a user selects an option to share a screen, but instead of captured video, frames of a current display are captured, encoded, and transmitted to other devices.

Often during a video conference, one or more users will select a screen sharing option to present some information to the other video conference attendees. While this sharing can be planned, such as for a planned presentation, screen sharing has also become a lot more spontaneous, with a user being asked to share a screen to display a particular document or demonstrate an application test. At the start of the screen sharing session, a user may accidentally share confidential information, such as due to other documents that are open on a display or due to a selection of an incorrect display. During a screen sharing session, the same issue may occur if a user opens a wrong document, selects a wrong tab, minimizes a document or application with other documents or applications still open, or scrolls through a document or application to confidential information.

One of the biggest issues with the accidental sharing of confidential information is that one cannot remedy the situation after the fact. No matter how quick a user is to switch off a tab or minimize a window, all it takes is the press of a couple of keys for a different user to perform a screen capture. Additionally, if the meeting is being recorded, the recording of the meeting may include the confidential information. While some video conferencing software packages include options for editing or removing the recording, this solution only works if: 1) the presenting user knows that confidential information was shared; and 2) if the meeting was recorded through the video conferencing software and not through an external recording application.

To address the aforementioned problem, in one approach, applications executing on a user device provide options for blurring content. For instance, the "Blue It Out" extension on the Google Chrome browser creates a blur effect for text that includes user-specified blacklisted words. While the extension is useful for using that specific application, the extension is application-specific. Any content outside of the application will still be displayed, such as content in a document or in presentation software.

Another approach to addressing this problem is to identify fields within a page that could contain confidential information through a recognition of an application or website. When the field is pre-identified as possibly containing confidential information, a system can blur any content that is typed into the field. This approach is deficient for the same reasons as the other approach in that it requires a known application for the blur to occur.

As mentioned previously, other modern approaches to solving this problem involve remedial actions that occur after the content has been shared or after a user notices that confidential content is being shared. The deficiencies to this approach involve timing. By the time any of these options can be employed, the content has already been delivered to the other displays.

To overcome such deficiencies, methods and systems are described herein for identifying and obscuring content on a display prior to transmission of the content to other devices. In an embodiment, prior to performing the encoding of a frame of a display for transmission to another device, the system analyzes the display through image and/or character recognition. The system then determines, based on the analyzed display, whether there is any information that is restricted for display, such as by comparing words identified through character recognition to words stored in a data repository. The system then obscures any images and/or characters determined to carry restricted information and encodes the frames of the display with the images and/or characters obscured prior to transmitting the frames to another device. In some embodiments, the system provides a notification and graphical user interface, allowing a user, prior to encoding the video display, to augment the obscuring of the images and/or characters or to allow the images and/or characters to be encoded without being obscured. Additionally, the system may detect changes to the display during screen sharing and, prior to encoding the changed display, perform the same methods to detect and obscure restricted information.

The present disclosure addresses the problems of accidental display of confidential information by 1) detecting confidential information throughout the display without requiring knowledge of applications executing on the computing devices; and 2) performing the obscuring of information prior to the encoding of the display, thereby ensuring that confidential information is identified and obscured prior to transmission from the computing device.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
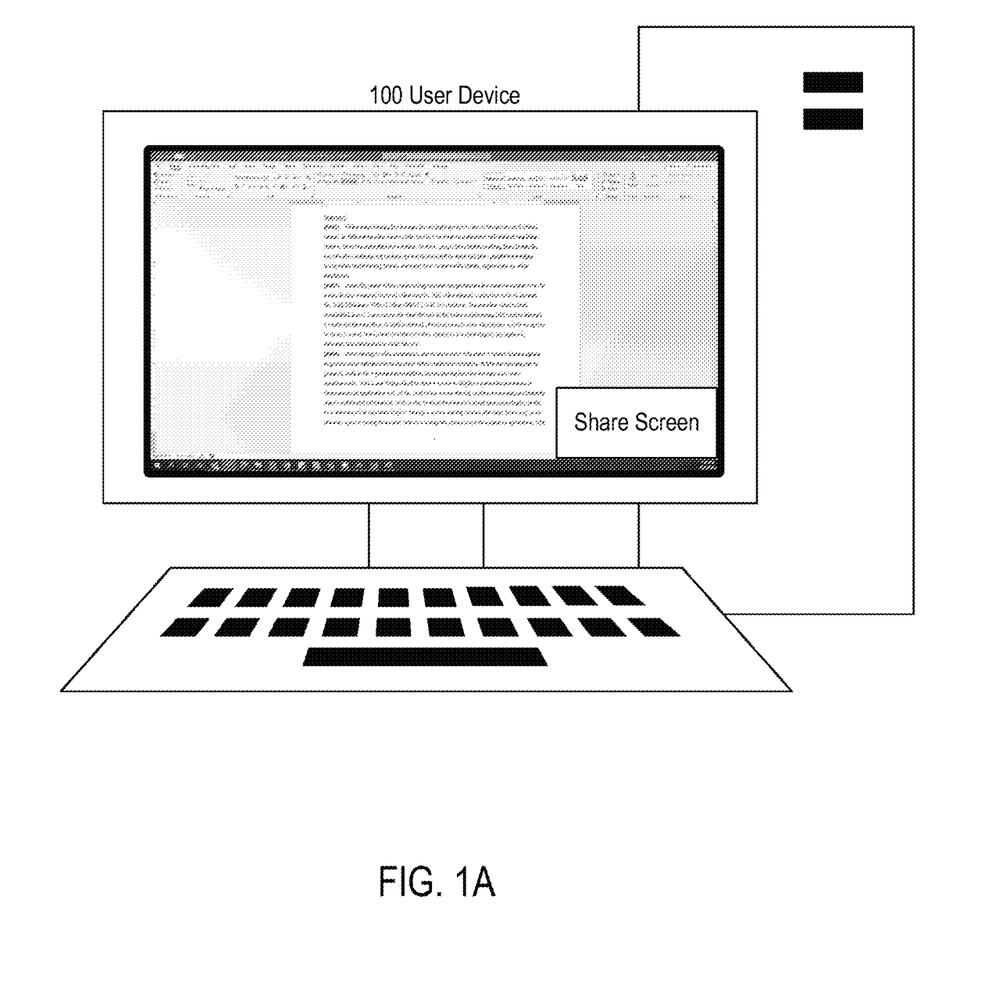
FIG. 1A depicts an example interface for performing a screen share operation.

FIG. 1A depicts an example interface for performing a screen share operation. In the exemplary embodiment of FIG. 1, a user device 100 displays an option to initiate a screen share operation for a display of the user device 100 with one or more other computing devices as part of a video conferencing session. The user device 100 may participate in the video conferencing session through an application executing on the user device 100, which communicates with a video conferencing server (not shown). The option to initiate the screen share operation for the display of the user device 100 may be provided through the video conferencing application.

A "display" of a user device, as used herein, refers to a graphical display that is presented through hardware, such as a computer monitor, television screen, or mobile device screen. A "display" of a user device may include a window on the first device, such as a browser window; a file on the first device, such as a slide presentation; an application on the first device, such as a video game; or an entire screen of the device, the "entire screen" comprising a portion of the display of the user device that encompasses one physical screen, such as a portion of the display that covers a single monitor. Any other portion of the graphical user interface of a user device may additionally encompass a display, in embodiments.

The screen share operation, as used herein, refers to an operation by which one or more images of a display of the user device are transmitted over a network and displayed on one or more recipient devices. The screen share operation may include a capture of an image of a display of the user device, encoding of the image for transmission to one or more other computing devices, decoding of the image at the one or more other computing devices, and display of the image at the one or more other computing devices, such as through the High Efficiency Video Coding (HEVC/H.265) standards. Throughout the description, HEVC will be provided as an example of video conferencing techniques, such as encoding or decoding of images. The methods described herein may be performed using any known video conferencing techniques where images of a display are encoded prior to transmission to recipient devices.

In an embodiment, the option to perform the screen share operation includes an option to select a display to be shared. The display may include any of a window on a client device, a file on the client device, an application on the client device, or an entire screen of the client device. The methods described herein are display agnostic and may be applied to any type of display that is being shared across a network.

Figure 4:
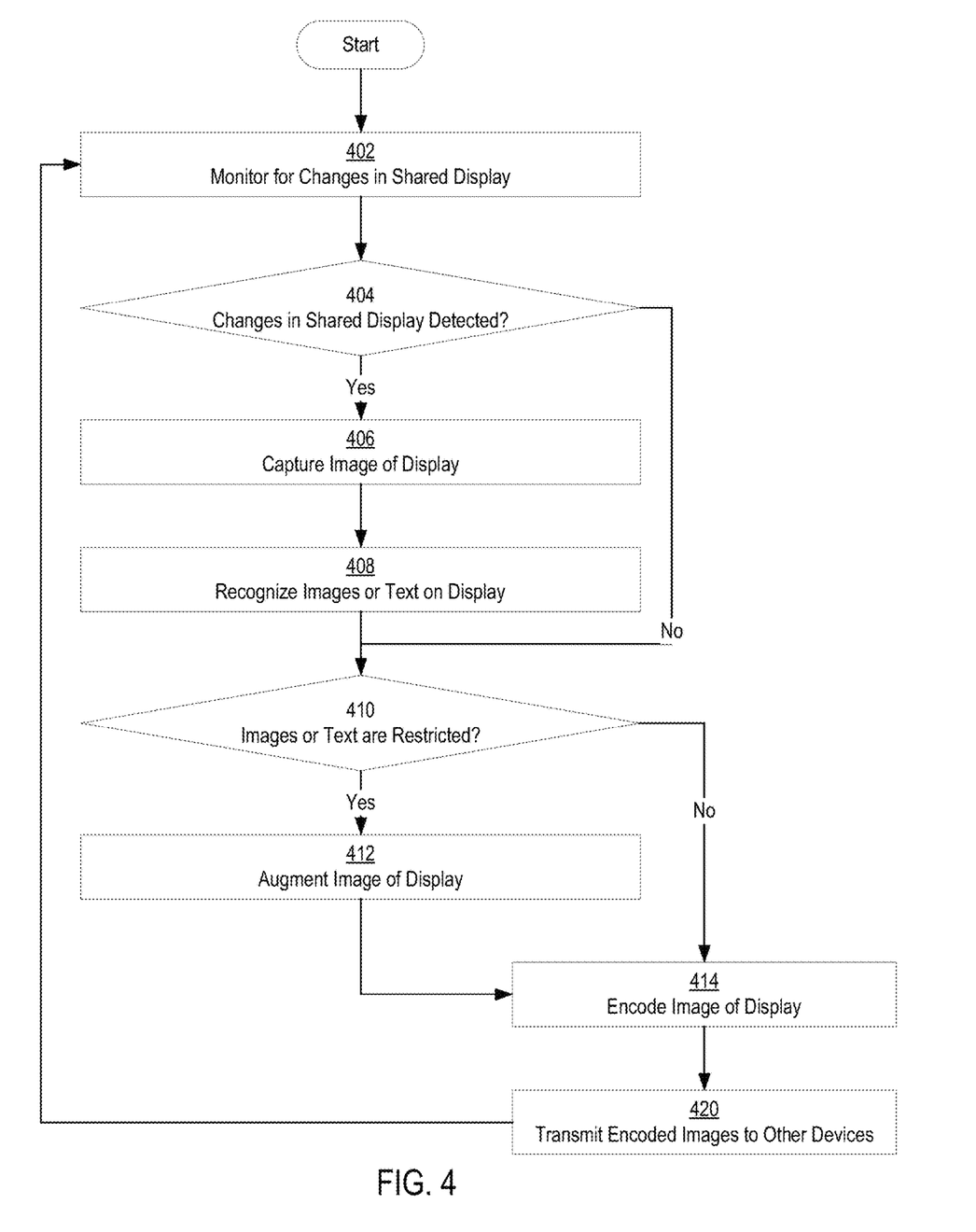
FIG. 4 is a flowchart depicting an example method for obscuring restricted text during a screen share operation.

While the method of FIG. 1 is described with respect to a single image of the display, other embodiments may be implemented for streaming of a plurality of images of the display, such as the embodiment of FIG. 4. In such embodiments, in addition to providing the obscuring based on the initial display to be shared, the system may monitor the display and perform the methods described herein in response to detecting a change in the display.

Figure 1B:
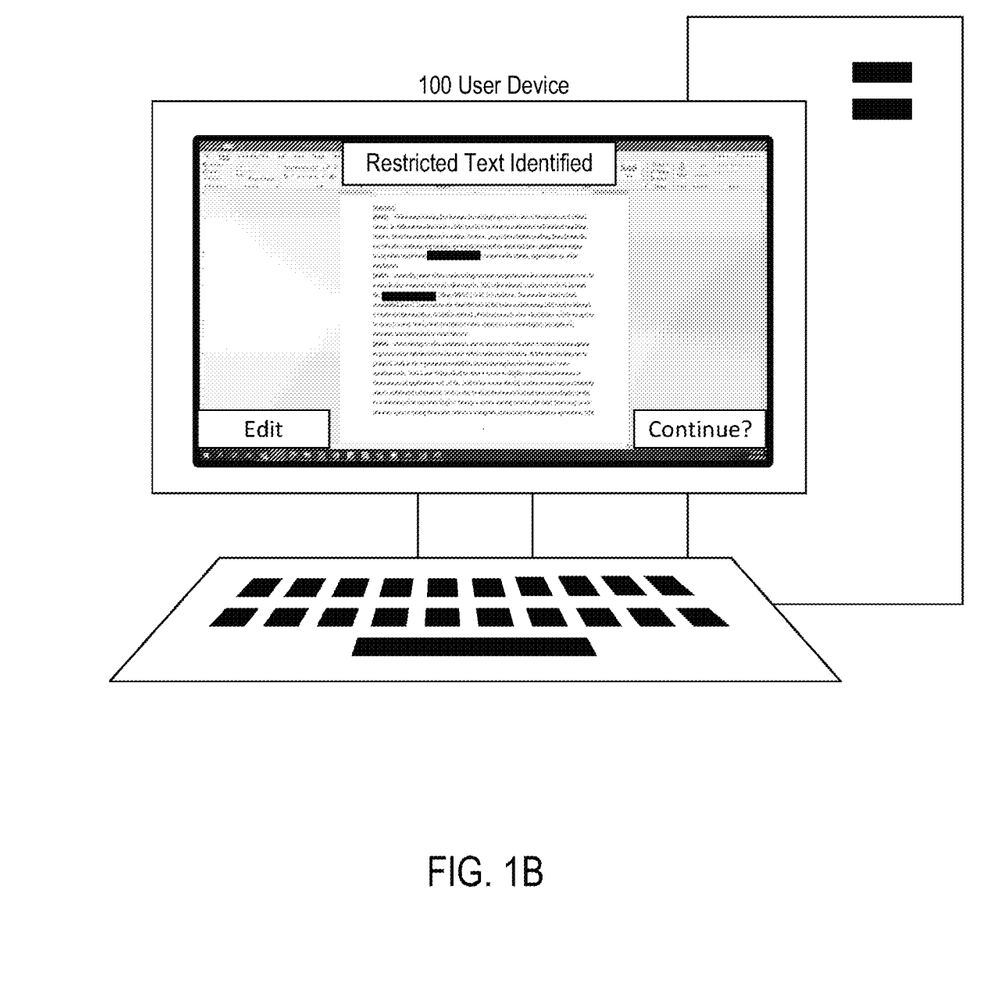
FIG. 1B depicts an example interface for obscuring restricted text during the screen share operation.

FIG. 1B depicts an example interface for obscuring restricted text during the screen share operation. In an embodiment, an interface for obscuring restricted text during the screen share operation, such as the interface of FIG. 1B, is displayed on the user device 100 in response to receiving a selection of an option to perform the screen share operation, such as through the share screen option of FIG. 1A, and in response to detecting restricted text and/or images, such as through the methods described further herein.

In the exemplary embodiment of FIG. 1B, a user interface provides an indication that restricted text was identified in an image of a display. The user interface further depicts an image of the display with the restricted text obscured. For instance, a black bar is depicted in FIG. 1B as covering portions of the text that were identified as being restricted. Other options may include screen blurring, text replacement, or other methods of obscuring or removing the text and/or images. In some embodiments, the user interface identifies the restricted text and/or images, such as through a red outline, a box around the text and/or images, or other methods of highlighting or modifying the depiction of the text and/or images, and provides an option for selecting the identified text and/or images and applying an obscuring element to the identified text and/or images, such as a blur or black box.

In the exemplary embodiment of FIG. 1B, the user interface provides an option to continue performing the screen share operation with the presented obscuring of restricted text and/or images. If the "continue" option is selected, the user device may proceed with encoding the image of the display, which has been augmented to obscure the restricted text and/or images. The encoded image of the display may then be transmitted over a network to a server computer and/or one or more external computing devices.

In the exemplary embodiment of FIG. 1B, the user interface provides an option to edit the obscuring of the restricted text and/or images prior to continuing the screen share operation. Additionally or alternatively, the user interface may provide an option for proceeding with the screen sharing operation without obscuring any of the identified restricted text.

Figure 1C:
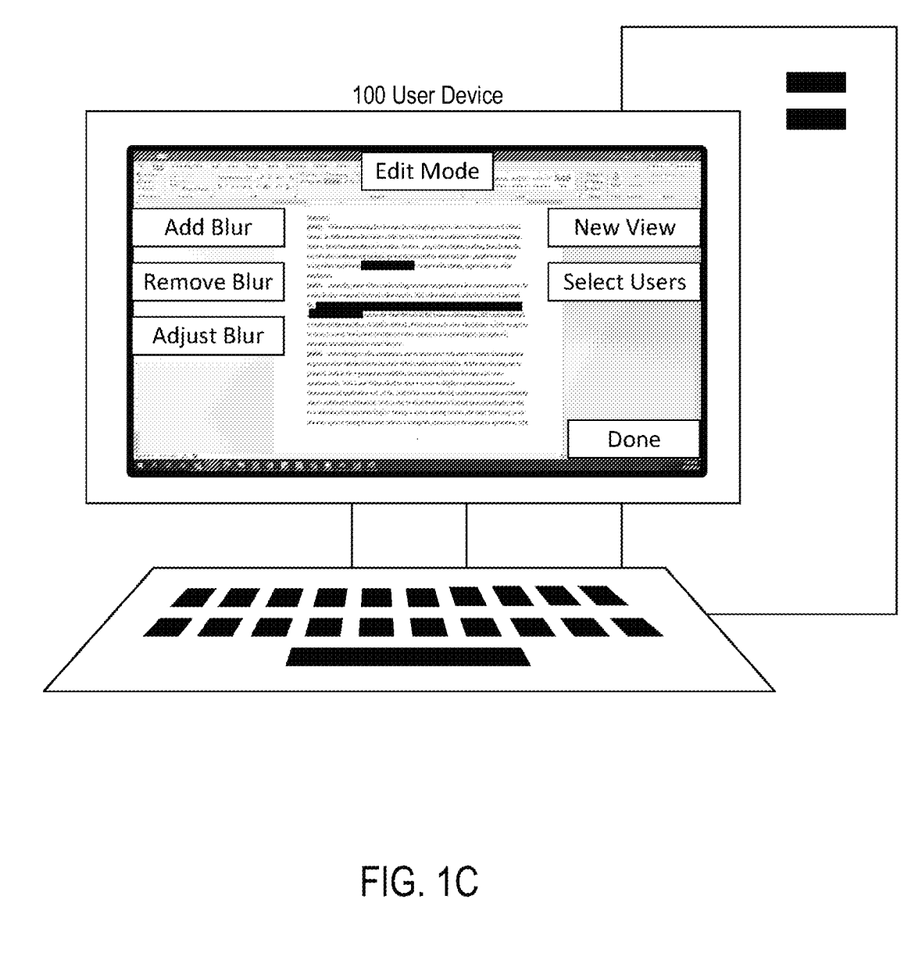
FIG. 1C depicts an example interface for editing obscuring of restricted text.

FIG. 1C depicts an example interface for editing obscuring of restricted text. In an embodiment, an interface for editing the obscuring of restricted text and/or images during the screen share operation, such as the interface of FIG. 1C, is displayed on the user device 100 in response to receiving a selection of an "edit" option, such as through the user interface of FIG. 1B. Additionally or alternatively, options to edit the obscuring of restricted text and/or images may be initially displayed in response to the detection of restricted text and/or images with the initial display of the augmented image of the display.

In the exemplary embodiment of FIG. 1C, the interface includes options for adding a graphical element to obscure a different portion of the display ("add blur") and for removing a graphical element that is obscuring a portion of the display ("remove blur"). The "add blur" option, when selected, may allow a user to select a portion of the graphical user interface to be obscured, such as through drawing of a box using a drag-and-drop of a cursor or through selection of text, such as highlighting recognized text in the image. The "remove blur" option, when selected, may allow a user to select an obscuring element on the augmented image of the display to remove, thereby making the original text and/or image unobscured.

In the exemplary embodiment of FIG. 1C, the interface includes an option for adjusting obscuring elements in the augmented image of the display. The "adjust blur" option, when selected, may allow a user to select an obscuring element to move, increase in size, decrease in size, or reshape. In some embodiments, adjusting the blur includes obscuring additional text that has been recognized in the image. For example, if a right edge of an obscuring black box is selected followed by a portion of text on a lower line than the obscuring black box, the black box may increase in size to cover the rest of the line of text that includes the black box, each line of text between the black box and the lower line, and a portion of the lower line prior to the location of the selection. For instance, in FIG. 1B, the lower black box began partway through a first line. When the black box is increased in size in FIG. 1C, it covers the rest of the first line and a beginning of the second line.

In the exemplary embodiment of FIG. 1C, the interface includes an option for selecting users for which to apply the obscured image. For example, a video conferencing session may include a first user, a second user, and a third user. If the first user selects the screen share option, the first user may be presented with the display of restricted text. When the "select users" option is selected, the interface may display identifiers of the second user and the third user. If only the second user is selected, then when the display is encoded, the augmented display with the obscured restricted text may be encoded for the second user, while a different image, with no obscured text or with different obscured text, may be encoded for the third user. This allows the first user to augment the display differently for different users so that different text and/or images are obscured for different users of the video conferencing session.

In the exemplary embodiment of FIG. 1C, the interface includes an option for generating a new view. The "new view" option, when selected, may allow a user to generate a different image for one or more different computing devices. For instance, in the above example, if the second user is selected initially through the "select users" option, when the "new view" option is selected, the "select users" option may be selected again to select the third user for the new display. The previously described editing functions may then be used to add obscuring elements, remove obscuring elements, or adjust obscuring elements. The performed changes may affect the image encoded for the third user device, but not for the second user device.

When editing has been completed, the "done" option may be selected to cause encoding of the augmented image or images of the display with the obscuring of the text and/or images. The encoded augmented image or images of the display may then be transmitted to corresponding computing devices. For example, the image of the display that was modified with a selection of the second user may be transmitted to a device of the second user, while the image of the display that was modified with a selection of the third user may be transmitted to a device of the third user.

FIGS. 1A, 1B, and 1C provide exemplary embodiments of user interfaces for the purpose of providing a clear example of an implementation of the methods described herein. Other user interfaces for providing options to share a screen, obscuring restricted text, and editing the obscuring of restricted text may be used in different embodiments.

In some embodiments, the client device stores video conferencing data after the video conferencing session. The video conferencing data may identify one or more users and/or user devices that participated in the video conferencing session. The video conferencing data may additionally identify words and/or images that were obscured. In embodiments where different words and/or images were obscured to different devices, the video conferencing data may additionally identify, for words and/or images that were obscured, for which devices the words and/or images were obscured. The video conferencing data may additionally or alternatively identify words and/or images that were recognized in images of the display that were not obscured. The words and/or images that were obscured and/or words and/or images that were not obscured may be stored in a searchable data structure. In response to a query for words and/or images that were obscured or not obscured, the client device may provide a list of words and/or images that were recognized during the video conferencing session. In an embodiment, the video conferencing data additionally identifies, for words and/or images that were not obscured, whether the words and/or images were identified as restricted, thereby indicating whether an override was received to display the words and/or images despite the words and/or images being identified as being restricted.

While methods are described with respect to a screen sharing session, other embodiments may be performed during video sharing. For instance, during a video conference, the client device may identify portions of images captured by a camera of the client device that contain restricted images and/or characters using the methods described herein and obscure the restricted images and/or text prior to encoding the images as described herein. Thus, if a blackboard behind a user contains restricted information, the client device may identify the restricted information in the image of the blackboard and obscure the restricted information using the methods described herein. Each of the embodiments described herein may be performed with a video by performing the same methods with images from a video feed instead of images of a display that is being shared. Similarly, the methods described herein may be performed for other types of interactive video sessions, such as video content streaming or video game streaming.

Figure 2:
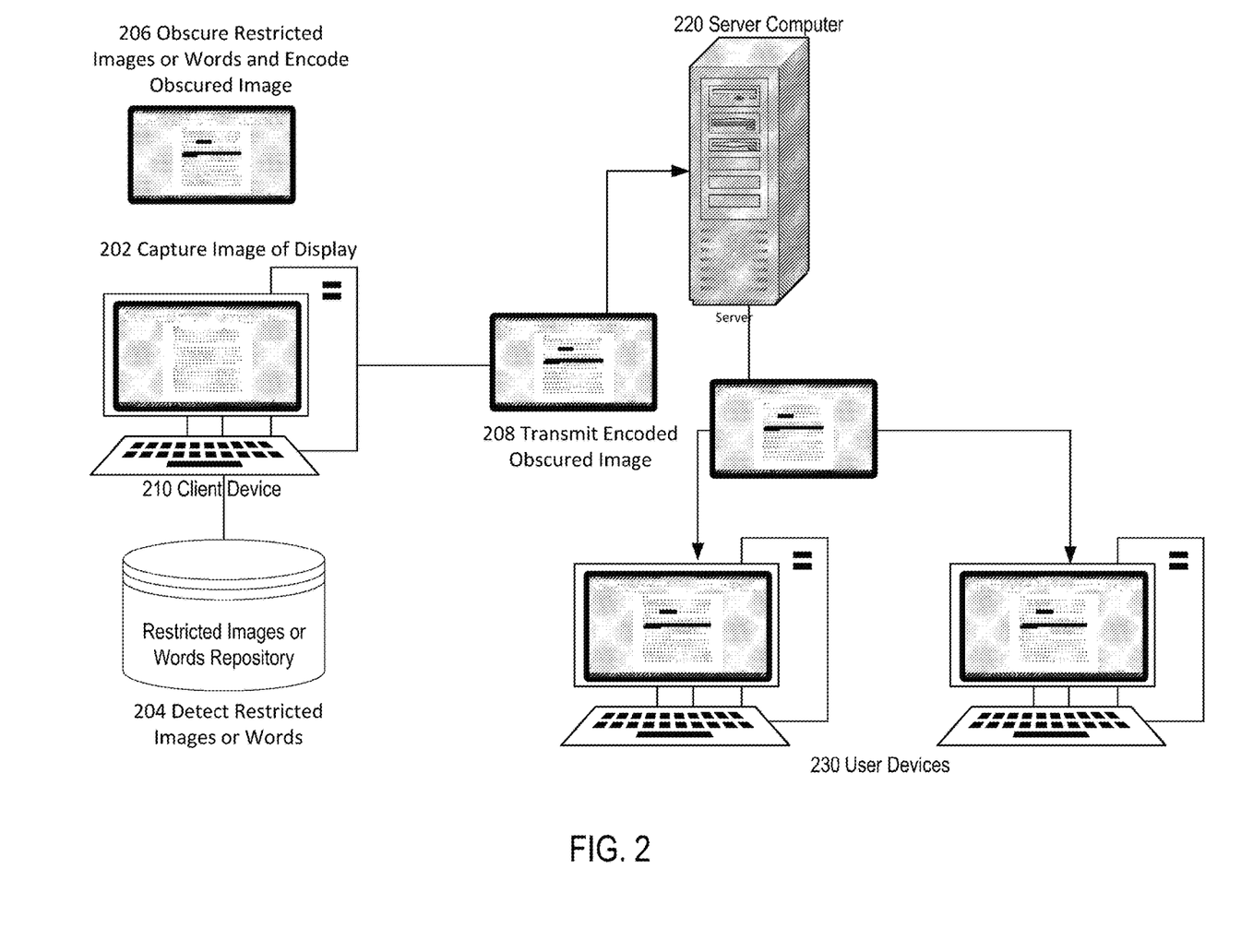
FIG. 2 depicts an example system and method for obscuring restricted text during a screen share operation.

FIG. 2 depicts an example system and method for obscuring restricted text during a screen share operation. The system of FIG. 2 includes a client device 210, a server 220, and a plurality of user devices 230. The system of FIG. 2 is depicted to provide an exemplary embodiment of a system for transitioning between radio broadcast and device music, and embodiments may be performed with more or fewer devices. For example, client device 210 may transmit the images of the display directly to one or more other user devices. As another example, an external server computer may perform character and/or image recognition and/or detect the restricted images and/or words in the text.

Client device 210 and the plurality of user devices 230 may comprise one or more communication devices configured to communicate with each other directly or indirectly through a server computer, such as through a wired or wireless connection. Client device 210 and user devices 230 may comprise any of a smartphone, personal computer, laptop computer, tablet, personal digital assistant (PDA), handheld gaming system, or other mobile computing system. Client device 210 and user devices 230 may be configured to transmit and receive images and/or video for a video conference, such as through a video conferencing application installed on the client device 210 and user devices 230.

Server 220 comprises one or more computing systems configured to manage video conferencing streams between the plurality of user devices 230 and the client device 210. Server 220 may be configured to receive encoded images and/or audio from the client device 210 and transmit the encoded images and/or audio for display to the plurality of user devices 230. For example, server 220 may comprise a video conferencing server configured to manage digital video streams between a plurality of computing devices.

At step 202, client device 210 captures an image of a current display. For example, client device 210 may receive input requesting to share a display of the client device 210 with the plurality of user devices 230, such as through a video conferencing application executing on the client device 210 provided by the server computer 220. The request may specify a particular display of the client device 210 to share, such as a particular window, a particular application, a particular file, or a particular screen. The client device 210 may, in response to the request to share the display of the client device 210, capture an image of the display that is to be shared, such as based on the HEVC standards.

At step 204, client device 210 detects restricted images and/or words in the image of the display using a restricted images and/or words repository. For example, the client device 210 may recognize characters within the image using optical character recognition (OCR) techniques or other known character recognition techniques. Additionally or alternatively, the client device 210 may transmit the image of the display to an external server computer that performs the OCR or other character recognition techniques and provides textual data to the client device 210 comprising text identified within the image.

Client device 210 may compare text and/or images in the display to text and/or images stored in a restricted images and/or words repository. The restricted images and/or words repository may comprise data defining words and/or images that are restricted. For example, the restricted images and/or words repository may comprise a database of text strings that are designated as restricted. The text string may be previously identified through user input and/or may comprise one or more default text strings, such as "financial report" or "confidential". The restricted images and/or words repository may additionally or alternatively include particular images, such as logos or product designs. The restricted images may additionally be added to the restricted images and/or words repository through user input. For instance, a graphical user interface executing on the client device and/or a different device, such as an administrator device, may include options for specifying words and/or images to add to the restricted images and/or words repository.

In an embodiment, the restricted images and/or words repository includes one or more rules for specifying parts of images and/or text that are to be restricted. For example, a rule may specify that a particular portion of an image is to be restricted while the rest is unrestricted. As another example, a rule may specify that one more words following a word identified in the restricted images and/or words repository are to be restricted. For instance, a rule may specify any identified numbers directly preceded by the term "quarterly losses" as being restricted.

In an embodiment, the restricted images and/or words repository specifies restricted images and/or words for different recipients and/or types of recipients. For example, a first restriction level for a first type of user, such as a head of a company, may include no restricted words and/or images. A second restriction level for a second type of user, such as a user within the company, may include a first plurality of words and/or images that are restricted. A third restriction level for a third type of user, such as any users external to the company, may include a second plurality of words and/or images that are restricted. The different levels of restrictions may be linked to users or types of users based on profile information, device information, email address, or other metadata that may be made available to the client device during a video conferencing session, such as through the video conferencing application. For example, a video conferencing application may provide email addresses of different video conference attendees to the client device which can then be linked to rules in the restricted images and/or words repository.

In an embodiment, the restricted images and/or words repository identifies different restrictions for different presenters. For example, different restriction levels, such as those described above, may be set based on metadata from the presenting device, such as a user profile or user email of the presenter. Thus, different restrictions may be set for both presenters and receivers during the screen sharing session.

While embodiments herein are described with respect to deterministic matching of text and/or images with text and/or images that are stored in the restricted images and/or words repository, other embodiments may include different methods of using stored data to identify restricted images and/or words. For example, a machine learning algorithm may be trained with inputs comprising text and/or images and outputs indicating whether the text and/or images are restricted, such as through a linear regression, neural network, logistic regression, or random forest models. More complex algorithms may take into account context, recipient types, sender, surrounding words and/or images, or other data related to the display and/or video conferencing session. Determining whether images and/or text should be restricted may include computing an output of the machine learning algorithm using inputs of images and/or recognized text from the image of the display.

In some embodiments, identifying restricted images and/or words comprises identifying interface elements in which restricted characters are likely to appear and/or a location in the interface elements in which the restricted characters are likely to appear. For example, the restricted images and/or words repository may store images of interface elements that are likely to contain restricted images and/or characters and data identifying a portion of the interface elements where the restricted images and/or characters are likely to appear. The client device may determine whether images with the image of the display match or partially match the images of interface elements stored in the restricted images and/or words repository. If the client device determines that there is a match, the client device may identify the portion of the interface element where the restricted images and/or text are likely to appear based on the stored data as containing restricted images and/or words.

At step 206, client device 210 obscures restricted images and/or words and encodes the obscured image. For example, client device 210 may augment the image of the display to obscure images and/or words that have been identified as being restricted, such as through a black bar, a blur effect, or other graphical means of obscuring the images and/or words. Thus, when the image is encoded, such as according to the HEVC standards, the encoded image already includes an obscuring element to obscure the restricted image and/or text.

In an embodiment, client device 210 initially displays a recommended obscuring of the image and/or text in the image of the display of the client device 210 with options for editing the obscuring of the image and/or text in the image of the display, such as is described with respect to FIG. 1C. The options may include any of options to move the obscuring elements, grow or shrink the obscuring elements; including selecting additional recognized text to be obscured; and add or remove obscuring elements. In an embodiment, the image is displayed on the client device 210 with identifiers of restricted images and/or words and an option to add obscuring elements to the restricted images and/or words.

In an embodiment, multiple images of the display of the client device are generated and encoded with different obscuring elements. For example, different words and/or images may be obscured based on a user device that receives the image of the display. Thus, a first image may be generated that obscures a first plurality of words and/or images based on data identifying a first recipient of the image of the display, and a second image may be generated that obscures a second plurality of words and/or images different from the first plurality of words and/or images based on data identifying a second recipient of the image of the display. In some embodiments, the client device 210 generates the different images of the display of the client device 210 automatically based on stored rules indicating different words and/or images that are to be obscured for different recipients and/or recipient types, such as roles within a company, clients, or general public/unidentified recipients. The client device 210, in some embodiments, provides options for overriding the assignment of different images to different recipients. Thus, if a user device signed into a video conferencing session through an unidentified account, such as through a personal email or mobile device, the user of the client device 210 may change the level of restriction applied to the user device.

In some embodiments, the client device 210 generates the different images of the display of the client device 210 in response to input requesting a generation of different images. For example, a graphical user interface executing on the client device 210 may comprise options for generating different levels of obscuring for different users, such as creating a new view and obscuring words and/or images for users selected to correspond to the new view. Additionally or alternatively, an obscuring tool may include options for defining users and/or groups of users to which the obscuring element would apply. The obscuring tool may comprise different visualizations for different users and/or groups of users, such as a red blur for a first group, a blue blur for a second group, and a purple blur for both the first and second group, thereby indicating in one visual interface which portions of the display will be obscured in different images of the display.

At step 208, client device 210 transmits the encoded obscured image to a server 220, which then transmits the image to user devices 230 and 240. For example, the client device 210 may transmit the encoded obscured image to the server 220 as part of a video conferencing session that is hosted by the server 220. In an embodiment, the client device 210 appends device identifiers to metadata of images, such as when different images of the display are sent to different devices. The device identifiers may uniquely identify one of the devices participating in the video conferencing session, such as through a user profile identifier or an internet protocol (IP) address of the device. The server 220 may then be configured to transmit different encoded images of the display with different portions obscured to different devices based on the appended device identifiers.

The embodiments described above provide an example for an initial implementation of the obscuring of images with the first image being sent from the client device to the user devices. In some embodiments, the client device 210 continues to obscure identified restricted text with subsequent images sent to the server 220. For instance, a stream of video from the client device 210 to the user devices 230 and 240 through server 220 may include a large number of images of the display of client device 210. While the display remains unchanged, the client device 210 may continue to obscure the identified words and/or images prior to encoding the images for transmission to the server 220. In some embodiments, when a change in the display is detected, the method of FIG. 2 repeats with client device 210 re-identifying text and/or images in the image of the client device and determining whether any of the text and/or images have changed. If the text and/or images that are being displayed have not changed, the client device may continue to obscure the previously identified text and/or images. If the text and/or images being displayed have changed, the client device may be configured to determine whether any of the text and/or images in the display should be restricted and continue with the process of FIG. 2. The obscuring of text and/or images after a change has been detected is described further herein with respect to FIG. 4.

Figure 3:
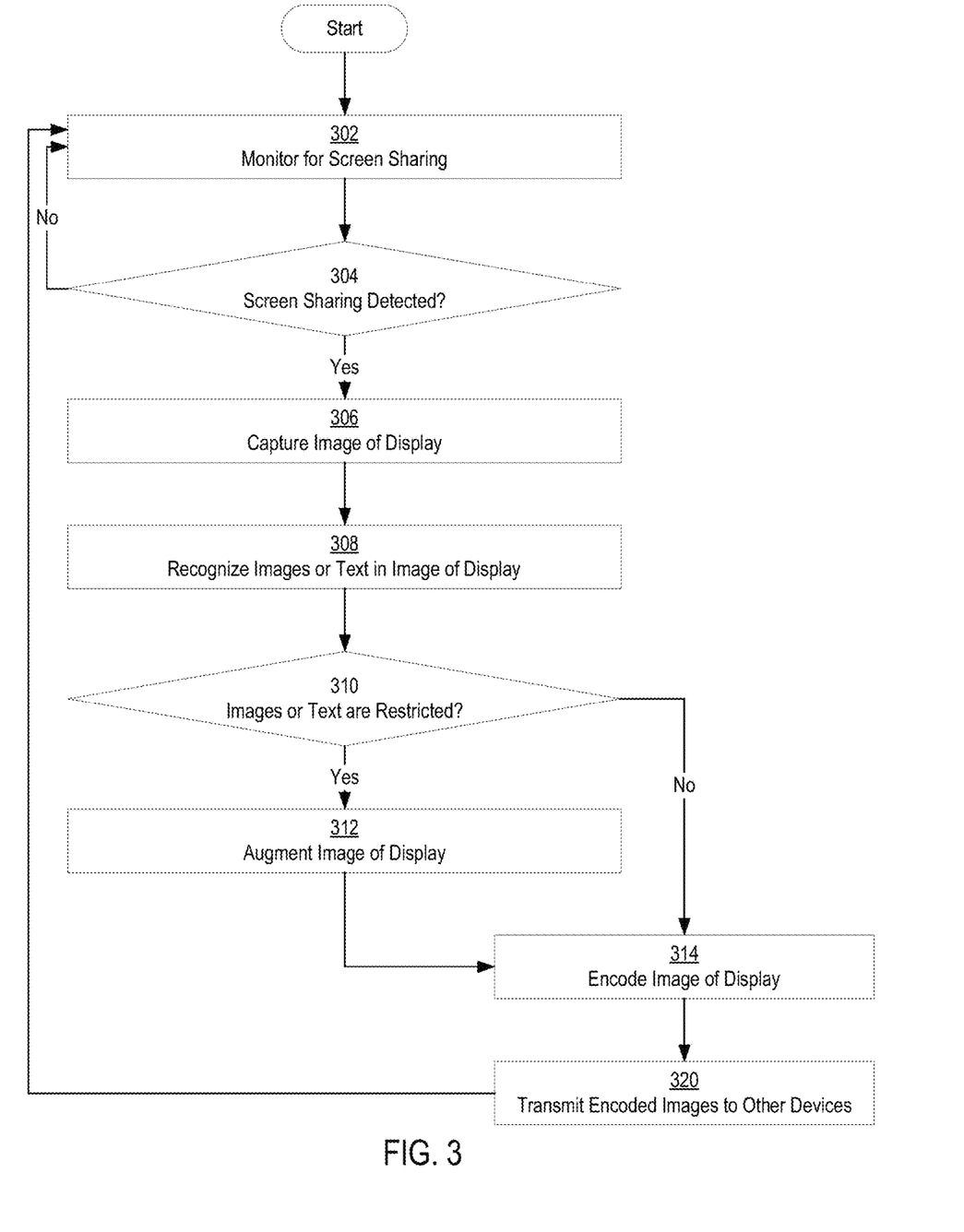
FIG. 3 is a flowchart depicting an example method for obscuring restricted text at an initiation of a screen share operation.

FIG. 3 is a flowchart depicting an example method for obscuring restricted text at an initiation of a screen share operation. FIG. 3 is intended to provide a representative example of a method of obscuring restricted text during a screen share operation at an initiation of the screen sharing operation. Other embodiments may be performed alternatively and/or in addition to the example of FIG. 3, such as the method of FIG. 4.

At step 302, control circuitry of a client device monitors for screen sharing. For example, a thread of a process of a video conferencing application executed by the control circuitry of the client device may monitor interactions with the video conference application to determine whether a request has been received through the video conferencing application to share a display with other devices in a video conferencing session.

At step 304, control circuitry of the client device determines if screen sharing has been detected. If screen sharing is not detected at step 304, the process returns to step 302, and control circuitry of the client device continues to monitor for screen sharing.

If, at step 304, control circuitry of the client device detects screen sharing, at step 306, control circuitry of the client device captures an image of a display. For example, a process of the video conferencing application may capture images of a selected display, such as a window or display screen, during a screen sharing operation for transmission to one or more other user devices through a server that hosts the video conferencing session. The image of the display may be captured using any known image capture techniques, such as those defined by the HEVC standards for video conferencing.

At step 308, control circuitry of the client device recognizes images and/or text in the captured image of the display. For example, a process executed by the control circuitry may perform optical character recognition to identify text characters in the image of the display and/or known image recognition techniques to identify one or more images in the image of the display. Additionally or alternatively, input/output circuitry of the client device may transmit the image of the display to an external computing device that performs the character and/or image recognition.

At step 310, control circuitry of the client device determines if any of the recognized images and/or text is restricted. For example, a process executed by the control circuitry may compare strings of characters and/or images to data stored in a repository identifying restricted text and/or images. If a string of characters, such as a word or plurality of words, or an image matches data stored in the repository, the control circuitry of the client device may determine that the matching text and/or images are restricted. Additionally or alternatively, pattern matching or machine learning techniques may be employed to determine, based on training data comprising text and/or images and an indication as to whether the text and/or images were restricted, whether text and/or images in the image of the display are restricted. If, at step 310, control circuitry of the client device determines that none of the recognized images and/or text is restricted, the process proceeds to step 314, which is described further herein.

If, at step 310, control circuitry of the client device determines at least a portion of the recognized images and/or text is restricted, at step 312, the control circuitry of the client device augments the image of the display. For example, the control circuitry of the client device may obscure the restricted images and/or text, such as through a black bar, a blur effect, removal of the text and/or images, or any other method of obscuring the restricted text. The obscuring of the restricted images and/or text may additionally include user input specifying whether to obscure restricted images and/or text, whether to obscure other images and/or text, or whether to change the obscuring of the images and/or text.

In some embodiments, user input may define whether to perform the obscuring methods described herein and/or may identify images and/or words to be restricted for performing the methods described herein. For example, a graphical user interface for a video conferencing session may include a first option for sharing a display without being obscured and a second option for sharing a display with restricted text being obscured. If the first option is selected, the client device may bypass steps 306-312 and proceed to encode the display as normal. If the second option is selected, the client device may perform the method of FIG. 3, may request input specifying images and/or words to be obscured, may request input specifying to which users to provide the restricted displays, and/or may provide an image of the display for a user to manually select portions of the display to obscure.

At step 314, control circuitry of the client device encodes the image of the display. For example, a process of the video conferencing application in a video coding layer of an HEVC process may encode the image of the display according to the HEVC standard. The step of 314 may be performed using an augmented image generated in step 312 with restricted text and/or images obscured and/or with an unmodified image, such as in response to the client device determining that none of the recognized images and/or text is restricted in step 310 or in response to user input specifying that an unmodified version of the display of the interface is to be transmitted to at least one recipient device.

At step 316, input/output circuitry of the client device transmits the encoded images to other devices. For example, the input/output circuitry of the client device may transmit the encoded images over a network as part of a video conferencing session to a server computer, which in turn transmits the encoded images over the network to the recipient devices. In some embodiments, the client device transmits the encoded images directly to the other client devices, such as through a short-range communication network, such as a Bluetooth network. The process then returns to step 302, and the control circuitry of the client device continues to monitor for screen sharing.

FIG. 4 is a flowchart depicting an example method for obscuring restricted text during a screen share operation.

At step 402, control circuitry of the client device monitors for changes in a shared display. For example, a process executing through the video conferencing application on the client device may be configured to determine whether the display that is being shared has changed by more than a threshold amount, such as through a change in slides; the opening or closing of a window, tab, or application; or a scrolling through an open window. Methods for detecting a change to a display that is being transmitted over a network through a video conferencing session are defined by the HEVC standard, but any method for detecting a change to a display may be used, such as image comparison techniques, which compare a current image of the display to an initial image of the display and/or an image of the display at a previous time when a change was detected.

At step 404, control circuitry of the client device determines if changes in the shared display are detected. If no changes in the shared display or text are detected and/or the detected changes are below or equal to a pre-defined change threshold, the process proceeds to step 410, which is described further herein. If a change in the shared display is detected and/or if detected changes are above a pre-defined change threshold, at step 406, control circuitry of the client device captures an image of the display.

At step 408, control circuitry of the client device recognizes images and/or text in the display. For example, control circuitry of the client device may perform the image and/or character recognition techniques to identify images and/or text in the display as described previously herein, or the input/output circuitry of the client device may transmit the image to an external server to perform the image and/or character recognition techniques.

At step 410, control circuitry of the client device determines if the images and/or text of the display are restricted. The control circuitry of the client device may determine whether the identified images and/or text in the display are restricted using any of the methods described herein. In some embodiments, the control circuitry of the client device additionally identifies images and/or words that were previously obscured using the methods described herein, such as through user input. For example, if the phrase "quarterly losses were disastrous" was initially obscured, if the phrase is identified in a different location of the display, such as due to scrolling having been performed, the control circuitry may determine that the phrase should be obscured in the new image. Thus, even if the phrase was not initially identified as being restricted based on stored data but was instead obscured through user input, the phrase may continue to be obscured when identified during the screen sharing operation.

If control circuitry of the client device determines that the images and/or text of the display are not restricted, the process proceeds to step 414, which is described further herein. If control circuitry of the client device determines that the images and/or text of the display are restricted, at step 412, control circuitry of the client device augments the image of the display. For example, the control circuitry of the client device may obscure the restricted text and/or images using the methods described previously herein. Additionally or alternatively, the control circuitry of the client device may display a graphical user interface that identifies the restricted text with input options for specifying whether the identified text should be obscured, such as through an interface similar to those discussed previously herein.

At step 414, control circuitry of the client device encodes the image of the display. For example, a process of the video conferencing application in a video coding layer of an HEVC process may encode the image of the display according to the HEVC standard. The step of 414 may be performed using an augmented image generated in step 412 with restricted text and/or images obscured and/or with an unmodified image, such as in response to the client device determining that none of the recognized images and/or text are restricted in step 410 or in response to user input specifying that an unmodified version of the display of the interface is to be transmitted to at least one recipient device.

At step 416, input/output circuitry of the client device transmits the encoded images to one or more other devices. For example, the input/output circuitry of the client device may transmit the encoded images over a network as part of a video conferencing session to a server computer which, in turn transmits the encoded images over the network to the recipient devices. In some embodiments, the client device transmits the encoded images directly to the other client devices, such as through a short-range communication network, such as a Bluetooth network. The process then returns to step 402, and the control circuitry of the client device continues to monitor for changes in the display.

As the method of FIG. 4 includes detecting the changes in the display and modifying the image of the display to obscure the restricted text and/or images prior to encoding of the image, the method ensures that recipient devices do not view restricted text and/or images before they can be obscured. The method of FIG. 4 may automatically obscure restricted text and/or images prior to the encoding without user input, thereby ensuring that the stream of the screen sharing appears uninterrupted to recipient devices. Alternatively, the method of FIG. 4 may include a request for user input in response to detection of the change and/or in response to detection of restricted text, such as input that modifies the obscuring of text and/or images or input that requests the client device to continue with the transmission with the identified text and/or images obscured. As the user input may take additional time to receive, the video conferencing session on the recipient devices may continue to display an image of the display prior to the detection of the change and/or display a notification indicating that streaming has been paused until user input is received on the client computing device.

Example Implementation: Hardware and Software Overview

Figure 5:
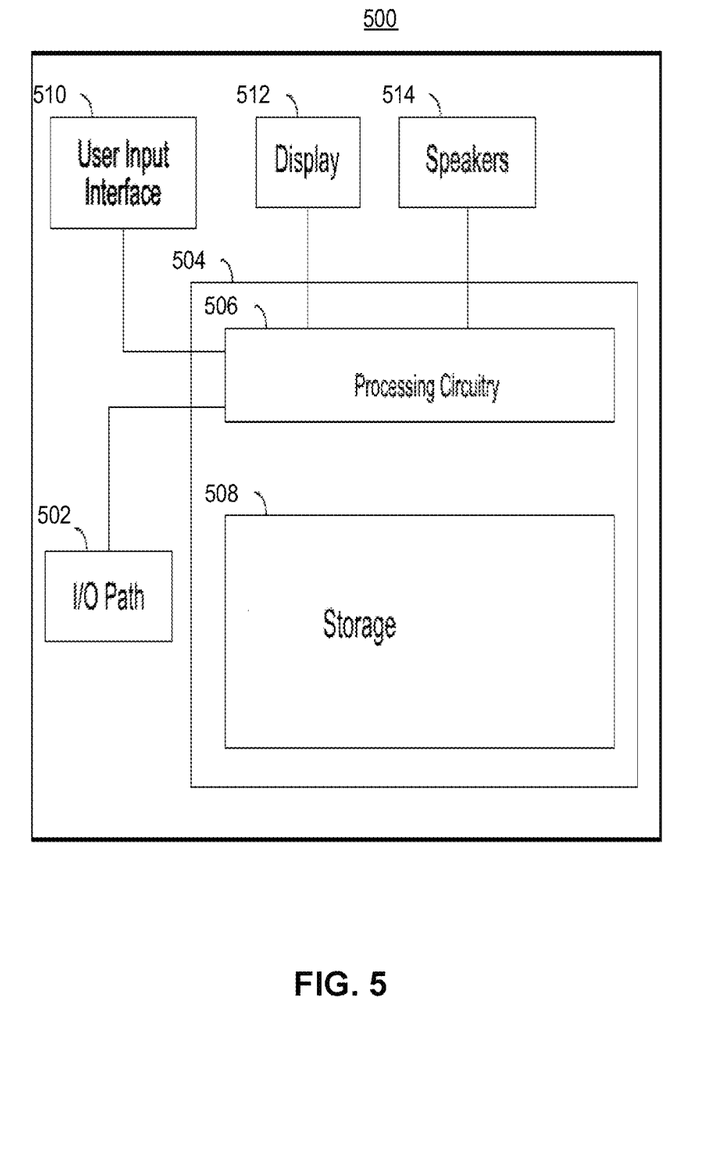
FIG. 5 depicts a block diagram of an illustrative user device, in accordance with some embodiments of the disclosure.

FIG. 5 depicts a generalized embodiment of an illustrative device (e.g., user device 50) that executes a video conferencing application and obscures restricted text and/or images in an image of a display of the device prior to encoding for transmission. Device 500 may be any of a plurality of user devices such as a smartphone, a tablet, personal computer, set-top box, server computer, etc. (discussed further below with respect to FIG. 11). Device 500 may receive the notification data via input/output (hereinafter "I/O") path 502. I/O path 502 may provide a notification data, application updates, or other data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below in relation to FIG. 11). I/O functions may be provided by one or more of these communications paths but are shown as a single path in FIG. 5 to avoid overcomplicating the drawing.

Control circuitry 504 may be based on any suitable processing circuitry such as processing circuitry 506. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 504 executes instructions for an application stored in memory (e.g., memory 508). In some implementations, any action performed by control circuitry 504 may be based on instructions received from an application executing on device 500.

The circuitry described herein, including, for example, tuning, audio generating, encoding, decoding, encrypting, decrypting, scaler, and analog/digital circuitry, may be implemented using software running on one or more general purpose or specialized processors. If storage 508 is provided as a separate device from user equipment device 500, the tuning and encoding circuitry may be associated with storage 508.

Storage 508 may be any device for storing electronic data, such as random-access memory, solid state devices, quantum storage devices, hard disk drives, non-volatile memory or any other suitable fixed or removable storage devices, and/or any combination of the same. Control circuitry 504 may allocate portions of storage 508 for various purposes such as caching application instructions, recording media assets, storing portions of a media asset, buffering segments of media, etc. As described herein, storage 508 may be used to store one or more LUTs storing a number of MAC addresses associated with a plurality of user equipment devices and their corresponding profile information.

A user may send instructions to control circuitry 504 using user input interface 510. User input interface 510 may be any suitable user input interface, such as a remote control, mouse, trackball, keypad, keyboard, touchscreen, touchpad, stylus input, joystick, voice recognition interface, or other user input interfaces. Instructions to control circuitry 504 may be transmitted through I/O path 502, which could consist of a video tracking and detection mechanism, Internet of Things (IoT) and home automation triggers, emergency alert systems, and software or hardware communication pipelines and/or notification centers.

Display 512 may be provided as a stand-alone device or integrated with other elements of each one of user equipment device 500. For example, display 512 may be a touchscreen or touch-sensitive display, a projector, or a casting device. In such circumstances, user input interface 510 may be integrated with or combined with display 512. Display 512 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 512. In some embodiments, the graphics processing circuitry may be external to processing circuitry 506 (e.g., as a graphics processing card that communicates with processing circuitry 506 via I/O path 502) or may be internal to processing circuitry 506 or control circuitry 504 (e.g., on a same silicone die as control circuitry 504 or processing circuitry 506). In some embodiments, the graphics processing circuitry may be used to receive, display, and play content.

Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514. The speakers 514 may be part of, but not limited to, a home automation system.

Streaming applications may be, for example, stand-alone applications implemented on user devices. For example, the streaming application may be implemented as software or a set of executable instructions, which may be stored in non-transitory storage 508 and executed by control circuitry 504 of a user device 1102, 1104, 1106. In such an approach, instructions of the streaming application are stored locally (e.g., in storage 508), and data for use by the application is downloaded on a periodic basis (e.g., from an out-of-band feed, from an Internet resource, or using another suitable approach). Control circuitry 504 may retrieve instructions of the streaming application from storage 508 and process the instructions to generate any of the displays discussed herein. Based on the processed instructions, control circuitry 504 may determine what action to perform when user input is received from input interface 510.

Figure 6:
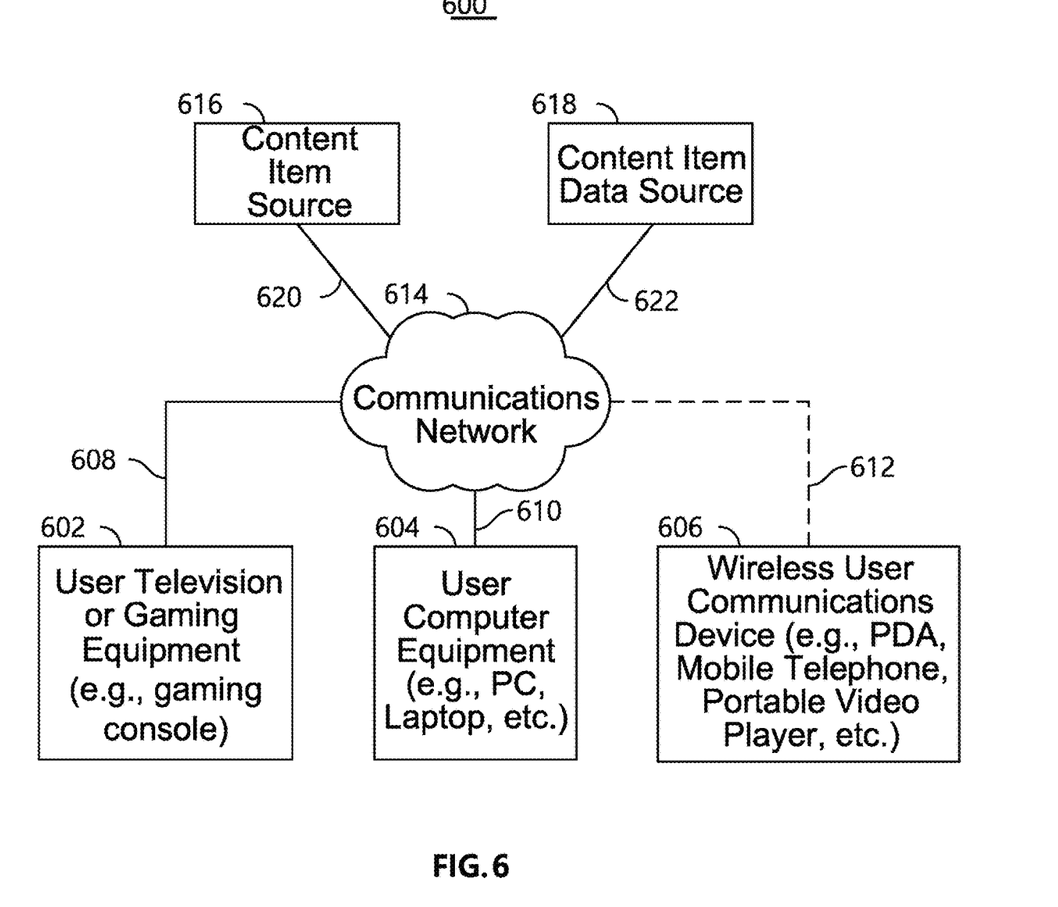
FIG. 6 depicts a block diagram of an illustrative media system, in accordance with some embodiments of the disclosure.

FIG. 6 depicts an exemplary media system in accordance with some embodiments of the disclosure, in which user device 100 and/or client device 210, and user equipment device 500 can be implemented in the media system 600 of FIG. 6 as user television equipment 602, user computer equipment 604, wireless user communications device 606, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 602 may include a set-top box, an integrated receiver decoder (IRD) for handling satellite television, a television set, a digital storage device, or other user television equipment. One or more of these devices may be integrated to be a single device, if desired. User computer equipment 604 may include a PC, a laptop, a streaming content aggregator, a PC media center, or other user computer equipment. It may include devices like digital assistance, smart speakers, and/or home automation. Wireless user communications device 606 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 600, there are typically more than one of each type of user equipment, but only one of each is shown in FIG. 6 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 614. Namely, user television equipment 602, user computer equipment 604, and wireless user communications device 606 are coupled to communications network 614 via communications paths 608, 610, and 612, respectively. Communications network 614 is used by the user equipment to obtain the video stream. Communications network 614 may be one or more networks including the Internet, a mobile phone network, ad-hoc network, or other types of communications network or combination of communications networks. Paths 608, 610, and 612 may separately or together include one or more communications paths, including any suitable wireless communications path. Path 612 is drawn as a dotted line to indicate it is a wireless path. Communications with the user equipment may be provided by one or more of these communications paths but are shown as a single path in FIG. 6 to avoid overcomplicating the drawing. The user equipment devices may communicate with each other directly through an indirect path via communications network 614.

System 600 includes content item source 616 and content item data source 618 coupled to communications network 614 via communications paths 620 and 622, respectively. Paths 620 and 622 may include any of the communications paths described above in connection with paths 608, 610, and 612. Communications with the content item source 616 and content item data source 618 may be exchanged over one or more communications paths but are shown as a single path in FIG. 6 to avoid overcomplicating the drawing. In addition, there may be more than one of each of content item source 616 and content item data source 618, but only one of each is shown in FIG. 6 to avoid overcomplicating the drawing. In some embodiments, content item source 616 and content item data source 618 are integrated as one source device. Although communications between sources 616 and 618 with user equipment are shown as through communications network 614, in some embodiments, sources 616 and 618 may communicate directly with user equipment devices 602, 604, and 606 via communications paths (not shown) such as those described above in connection with paths 608, 610, and 612.

Content item source 616 or content item data source 618 may include one or more types of media distribution equipment such as a media server, cable system headend, satellite distribution facility, intermediate distribution facilities and/or servers, Internet providers, on-demand media servers, and other media providers. Content item source 616 or content item data source 618 may be the originator of media content or may not be the originator of media content. Content item source 616 or content item data source 618 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 600 is intended to illustrate a number of approaches, or network configurations, by which user equipment devices and sources of media content and guidance data may communicate with each other for the purpose of accessing media and data related to the media. The configuration of the devices and paths in system 600 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, the processes of FIG. 2-4 can be performed on any of the devices shown in FIGS. 5-6. Additionally, any of the steps in processes of FIG. 2-4 can be performed in any order, can be omitted, and/or can be combined with any of the steps from any other process.

What is claimed is:

1. A method comprising:
    capturing, during a video conferencing session, a display area of a providing device;
    determining that one or more images or one or more characters of the display area is restricted;
    in response to the determining that the one or the more images or the one or more characters of the display area is restricted:
        generating for display a user interface depicting an option to obscure at least a portion of the display area;
        receiving a selection of a first receiving device; and
        transmitting, to the first receiving device, the display area such that the one or more images or the one or more characters are obscured; and
        transmitting, to a second receiving device, the display area such that the one or more images or the one or more characters are unobscured.

2. The method of claim 1, wherein the determining that the one or more images or the one or more characters of the display area is restricted comprises:
    detecting a change to the display area between a previous image of the display area transmitted to the first receiving device and a current image of the display area transmitted to the first receiving device.

3. The method of claim 1, further comprising:
    generating for display of the user interface, an option to change a size or shape of the portion of the display area to be obscured.

4. The method of claim 1, further comprising:
    accessing stored data corresponding to the one or more images or the one or more characters to determine that the one or more images or the one or more characters is restricted;
    determining first user information associated with the first receiving device and second user information associated with a third receiving device;
    identifying a first restriction for the first receiving device based on the first user information and identifying a second restriction for the second receiving device based on the second user information, the second restriction being different from the first restriction,
    wherein the one or more images or the one or more characters of the display area as transmitted to the first receiving device are obscured according to the first restriction; and
    transmitting to the third receiving device the display area such that the one or more images or the one or more characters are obscured according to the second restriction.

5. The method of claim 4, wherein the stored data identifies images of interface elements in which restricted characters are likely to appear, and
    wherein the determining that the one or more images or the one or more characters is restricted comprises determining that a portion of the display area matches one of the images of interface elements and that the portion of the display area includes characters.

6. The method of claim 4, wherein the stored data comprises a plurality of different images and wherein the determining that the one or more images or one or more characters is restricted comprises determining, using a machine learning system, that a portion of the display area is similar to one or more images of the plurality of different images.

7. The method of claim 1, further comprising:
    identifying user information corresponding to the second receiving device;
    identifying restrictions for the second receiving device based on the user information corresponding to the second receiving device, wherein the restrictions for the second receiving device do not include restrictions of the one or more images or the one or more characters; and
    performing content encoding of an image of the display area without the one or more images or one or the more characters being obscured and transmitting an encoded image to the second receiving device.

8. The method of claim 1, further comprising:
    performing character or image recognition of the display area to identify the one or more images or the one or more characters in the display area;
    based on the character or image recognition, identifying a plurality of characters in the display area that are not obscured; and
    storing conference sharing data that identifies a user corresponding to the providing device, a user corresponding to the first receiving device, and the plurality of characters in the display that are not obscured.

9. The method of claim 1, further comprising:
    storing conference sharing data that identifies the plurality of characters in the display that are obscured.

10. A system comprising:
communication circuitry configured:
   to capture, during a video conferencing session, a display area of a providing device; and
processing circuitry configured:
   to determine that one or more images or one or more characters of the display area is restricted; and
   in response to the determining that the one or more images or the one or more characters of the display area is restricted:
      to generate for display a user interface depicting an option to obscure at least a portion of the display area;
      to receive a selection of a first receiving device; and
      to transmit, to the first receiving device, the display area such that the one or more images or the one or more characters is obscured; and
      to transmit, to a second receiving device, the display area such that the one or more images or the one or more characters is unobscured.

11. The system of claim 10, wherein the determining that the one or more images or the one or more characters of the display area is restricted comprises:
   detecting a change to the display area between a previous image of the display area transmitted to the first receiving device and a current image of the display area transmitted to the first receiving device.

12. The system of claim 10, wherein the processing circuitry is further configured:
   to generate for display of the user interface, an option to change a size or shape of the portion of the display area to be obscured.

13. The system of claim 10, wherein the processing circuitry is further configured:
   to access stored data corresponding to the one or more images or the one or more characters to determine that the one or more images or the one or more characters is restricted;
   to determine first user information associated with the first receiving device and second user information associated with a third receiving device;
   to identify a first restriction for the first receiving device based on the first user information and identifying a second restriction for the second receiving device based on the second user information, the second restriction being different from the first restriction,
   wherein the one or more images or the one or more characters of the display area as transmitted to the first receiving device are obscured according to the first restriction; and
   transmitting to the third receiving device the display area such that the one or more images or the one or more characters are obscured according to the second restriction.

14. The system of claim 13, wherein the stored data identifies images of interface elements in which restricted characters are likely to appear, and
   wherein the determining that the one or more images or the one or more characters is restricted comprises determining that a portion of the display area matches one of the images of interface elements and that the portion of the display area includes characters.

15. The system of claim 13, wherein the stored data comprises a plurality of different images and wherein the determining that the one or more images or one or more characters is restricted comprises determining, using a machine learning system, that a portion of the display area is similar to one or more images of the plurality of different images.

16. The system of claim 10, wherein the processing circuitry is further configured:
   to identify user information corresponding to the second receiving device;
   to identify restrictions for the second receiving device based on the user information corresponding to the second receiving device, wherein the restrictions for the second receiving device do not include restrictions of the one or more images or the one or more characters; and
   to perform content encoding of an image of the display area without the one or more images or one or the more characters being obscured and transmitting an encoded image to the second receiving device.

17. The system of claim 10, wherein the processing circuitry is further configured:
   to perform character or image recognition of the display area to identify the one or more images or the one or more characters in the display area;
   based on the character or image recognition, to identify a plurality of characters in the display area that are not obscured; and
   to store conference sharing data that identifies a user corresponding to the providing device, a user corresponding to the first receiving device, and the plurality of characters in the display that are not obscured.

18. The system of claim 10, wherein the processing circuitry is further configured:
   to store conference sharing data that identifies the plurality of characters in the display that are obscured.

* * * * *